(12) United States Patent
Haynes

(10) Patent No.: US 7,226,086 B2
(45) Date of Patent: Jun. 5, 2007

(54) MUD FLAP MOUNTING SYSTEM AND METHOD FOR USE THEREOF

(76) Inventor: Norman Anthony Haynes, 7124 Red Lake Ct., Indianapolis, IN (US) 46217

( * ) Notice: Subject to any disclaimer, the term of this patent is extended or adjusted under 35 U.S.C. 154(b) by 39 days.

(21) Appl. No.: 10/988,063

(22) Filed: Nov. 13, 2004

(65) Prior Publication Data

US 2005/0104317 A1 May 19, 2005

Related U.S. Application Data

(60) Provisional application No. 60/520,593, filed on Nov. 17, 2003.

(51) Int. Cl.
*B62D 25/18* (2006.01)
(52) U.S. Cl. .................. 280/851; 280/154; 280/847
(58) Field of Classification Search ......... 280/154.5 R, 280/152.3, 159, 160, 847–849, 851, 154; 296/198; 180/84
See application file for complete search history.

(56) References Cited

U.S. PATENT DOCUMENTS

| | | | |
|---|---|---|---|
| 1,411,254 A * | 4/1922 | Braucci ................ 280/160 |
| 1,954,919 A * | 4/1934 | Carey ................... 40/591 |
| 2,683,612 A | 7/1954 | Bacino | |
| 2,714,015 A | 7/1955 | Sherman | |
| 2,809,848 A | 10/1957 | Carswell | |
| 2,826,428 A * | 3/1958 | Lincoln ................ 280/851 |
| 2,865,655 A | 12/1958 | Boysen | |
| 2,935,336 A | 5/1960 | Case | |
| 3,051,508 A * | 8/1962 | Federspiel ............ 280/851 |
| 3,095,215 A | 6/1963 | Black | |
| 3,158,386 A | 11/1964 | Tillinghast | |
| 3,219,363 A | 11/1965 | Dalsey | |
| 3,248,126 A | 4/1966 | Sexton et al. | |
| 3,258,887 A | 7/1966 | Mostoller | |
| 3,285,624 A | 11/1966 | Aber | |
| 3,333,868 A | 8/1967 | Sogoian | |
| 3,632,137 A * | 1/1972 | Jossy .................... 280/851 |

(Continued)

FOREIGN PATENT DOCUMENTS

BE 493696 6/1950

(Continued)

*Primary Examiner*—Christopher P. Ellis
*Assistant Examiner*—Vaughn T. Coolman
(74) *Attorney, Agent, or Firm*—Woodard, Emhardt, Moriarty, McNett & Henry LLP

(57) ABSTRACT

A mud flap mounting system for connection to a mud flap mounting bracket of a vehicle that allows release and reinstallation of mud flap when it is pinched between a rotating tire and an obstruction. The system includes a flexible sheet of mud flap material with a top edge defining at least two mounting boles with both mounting holes to include a bolt hole and either a slot or a first slit extending from the top edge and to its corresponding bolt hole, at least a second slit may be used in conjunction with sheet having a first slit. The second slit or plurality of second slits extend from the bolt hole, parallel to, or away from the top edge of the mud flap material. The threaded distal end of a bolt extends through the mounting hole in the sheet and extends through a bracket hole in the mounting bracket.

24 Claims, 16 Drawing Sheets

U.S. PATENT DOCUMENTS

| | | |
|---|---|---|
| 3,700,260 A | 10/1972 | Moore et al. |
| 3,711,119 A * | 1/1973 | Hollingsworth ............. 280/851 |
| 3,726,544 A | 4/1973 | Miller |
| 3,778,086 A | 12/1973 | Moore |
| 3,822,897 A | 7/1974 | Heath |
| 3,940,165 A | 2/1976 | Sogoian |
| 4,180,230 A | 12/1979 | Sogoian |
| 4,856,816 A * | 8/1989 | Francis ....................... 280/851 |
| 5,044,667 A | 9/1991 | Manning |
| 5,460,412 A | 10/1995 | Vincent et al. |
| 5,486,079 A | 1/1996 | Martin |
| 5,829,786 A * | 11/1998 | Dahl .......................... 280/848 |
| 5,915,708 A | 6/1999 | Silva |
| 5,967,553 A | 10/1999 | Cominsky |
| 6,116,628 A | 9/2000 | Adrian |
| 7,040,662 B2 * | 5/2006 | Barr et al. .................. 280/847 |

FOREIGN PATENT DOCUMENTS

| | | |
|---|---|---|
| GB | 604068 | 6/1948 |

* cited by examiner 14,54

14,54

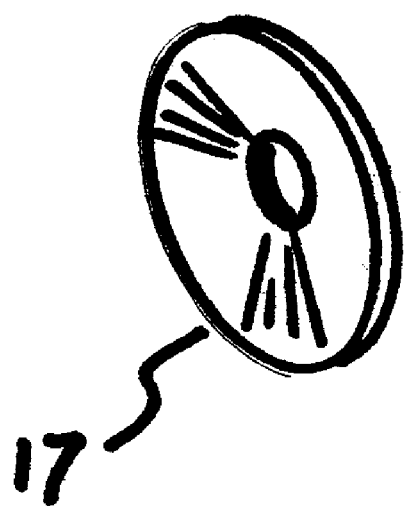
FIG. 11A
FIG. 11B
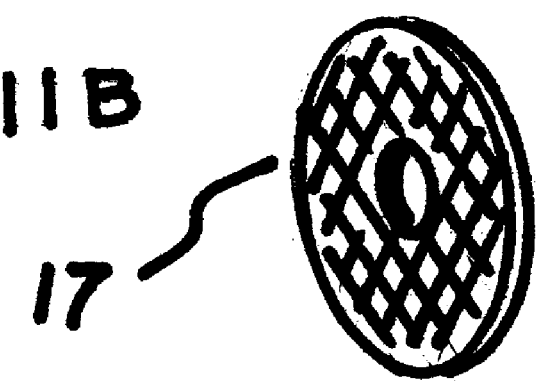
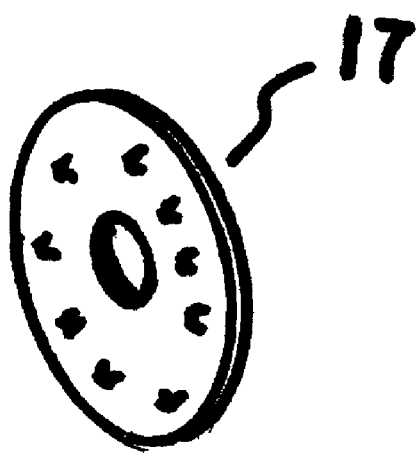
FIG. 11C

US 7,226,086 B2

MUD FLAP MOUNTING SYSTEM AND METHOD FOR USE THEREOF

CROSS-REFERENCE TO RELATED APPLICATIONS

This application claims the benefit of the copending U.S. Provisional Patent Applications:
60/511,385
Filed Oct. 15, 2003
60/520,593
Filed Nov. 17, 2003

FIELD OF THE INVENTION

The field of endeavor of the instant invention pertains to the attachment of mud flaps (splash guards) for trucks, semi-tractor/trailers and the like.

BACKGROUND OF THE INVENTION

The utilization of mud flaps on trucks and semi-tractor/trailers and the like is required by law in most states. Mud flaps are made of a sheet of flexible material. The top edge of the mud flap has mounting holes to receive mounting bolts and nuts. The mud flap is secured to a mounting bracket which is attached to the vehicle chassis. A critical stress occurs when the mud flap is unintentionally pinched between a rotating tire and a curb or other obstruction while backing up the vehicle. This extremely high instantaneous tensile stress usually tears the mud flap off its mounting bracket, destroying the mud flap and often times destroying or at least bending the mounting bracket as well. The damage must then be repaired and the mud flap replaced. What is desired is an improved apparatus for attaching mud flaps to their mounting brackets that incorporates simple methods of releaseability and reinstallation if the mud flap is backed over. A number of mud flap mounting arrangements are disclosed in the following U.S. and foreign patents.

REFERENCES CITED REFERENCED BY

U.S. Patent Documents

| | | |
|---|---|---|
| 2683612 | July, 1954 | Bacino |
| 2714015 | July, 1955 | Sherman |
| 2809848 | October, 1957 | Carswell |
| 2826428 | March, 1958 | Lincoln |
| 2865655 | December, 1958 | Boysen |
| 2935336 | May, 1960 | Case |
| 3051508 | August, 1962 | Federspiel |
| 3095215 | June, 1963 | Black |
| 3158386 | November, 1964 | Tillinghast |
| 3219363 | November, 1965 | Dalsey |
| 3248126 | April, 1966 | Sexton et al |
| 3258887 | July, 1966 | Mostoller |
| 3285624 | November, 1966 | Aber |
| 3333868 | August, 1967 | Sogoian |
| 3700260 | October, 1972 | Moore et al |
| 3711119 | January, 1973 | Hollingsworth |
| 3726544 | April, 1973 | Miller |
| 3778086 | December, 1973 | Moore |
| 3822897 | July, 1974 | Heath |
| 3940165 | February, 1976 | Sogoian |
| 4180230 | December, 1979 | Sogoian |
| 4856816 | August, 1989 | Francis |
| 5044667 | September, 1991 | Manning |
| 5460412 | October, 1995 | Vincent |
| 5486079 | January, 1996 | Martin |
| 5915708 | June, 1999 | Silva |
| 5967553 | October, 1999 | Cominsky |
| 6116628 | September, 2000 | Adrian |

Foreign Patent Documents

| | | |
|---|---|---|
| 493696 | June, 1950 | BE. |
| 604068 | June, 1948 | GR. |
| 321968 | October, 1934 | IT. |

BRIEF SUMMARY OF THE INVENTION

The object of the present invention is to provide an economical and practical means of reducing repair and down-time costs incurred when a mud flap is accidentally pinched between a rotating tire and a curb or other obstruction while backing up the vehicle. By using mud flaps with slit or slotted mounting holes and a spring activated pressure plate to hold the mud flap in their service position, a "weakest link" scenario is created at the mud flap mounting points, producing the desired releaseability function. The same mud flap can then be reinstalled easily in a short length of time on the undamaged Mud Flap Mounting Bracket.

BRIEF DESCRIPTION OF THE SEVERAL VIEWS OF THE INVENTION

FIGS. 11A, 11B, 11C and 11D shows alternate pressure plate designs in accordance with the first embodiment of the present invention.

DETAILED DESCRIPTION OF THE INVENTION

A "vehicle" as described herein is intended to include trucks, semi-tractors and semi-trailers, all of which having a mud flap mounting bracket. The mud flap mounting bracket is any structure at the rear of such vehicles that has at least a portion that is configured for receipt of one or more mud flaps.

First Embodiment

Figure 1:
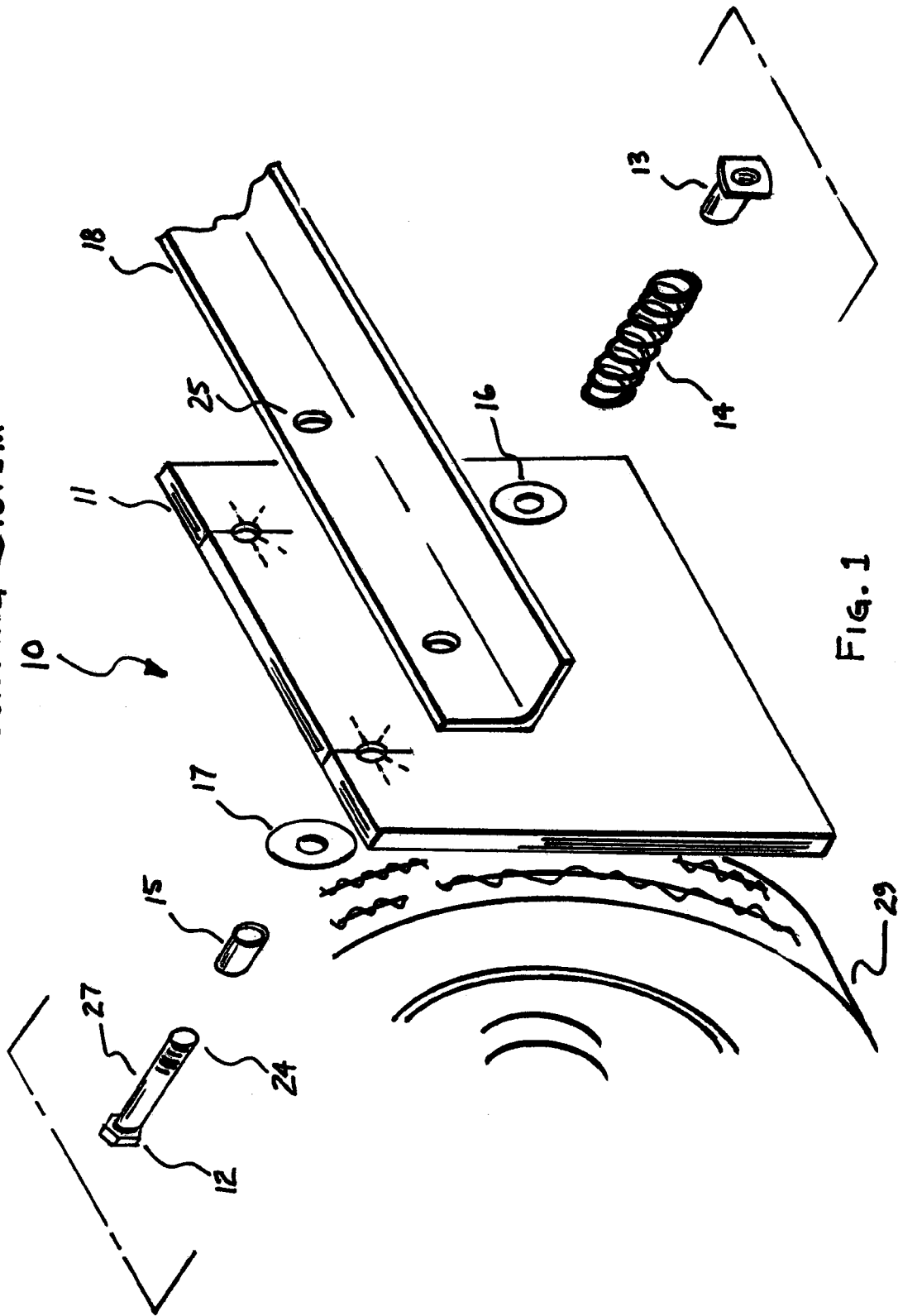
FIG. 1 is an isometric exploded view of the Mud Flap Mounting System 10, in accordance with first embodiment of the present invention.
Figure 2:
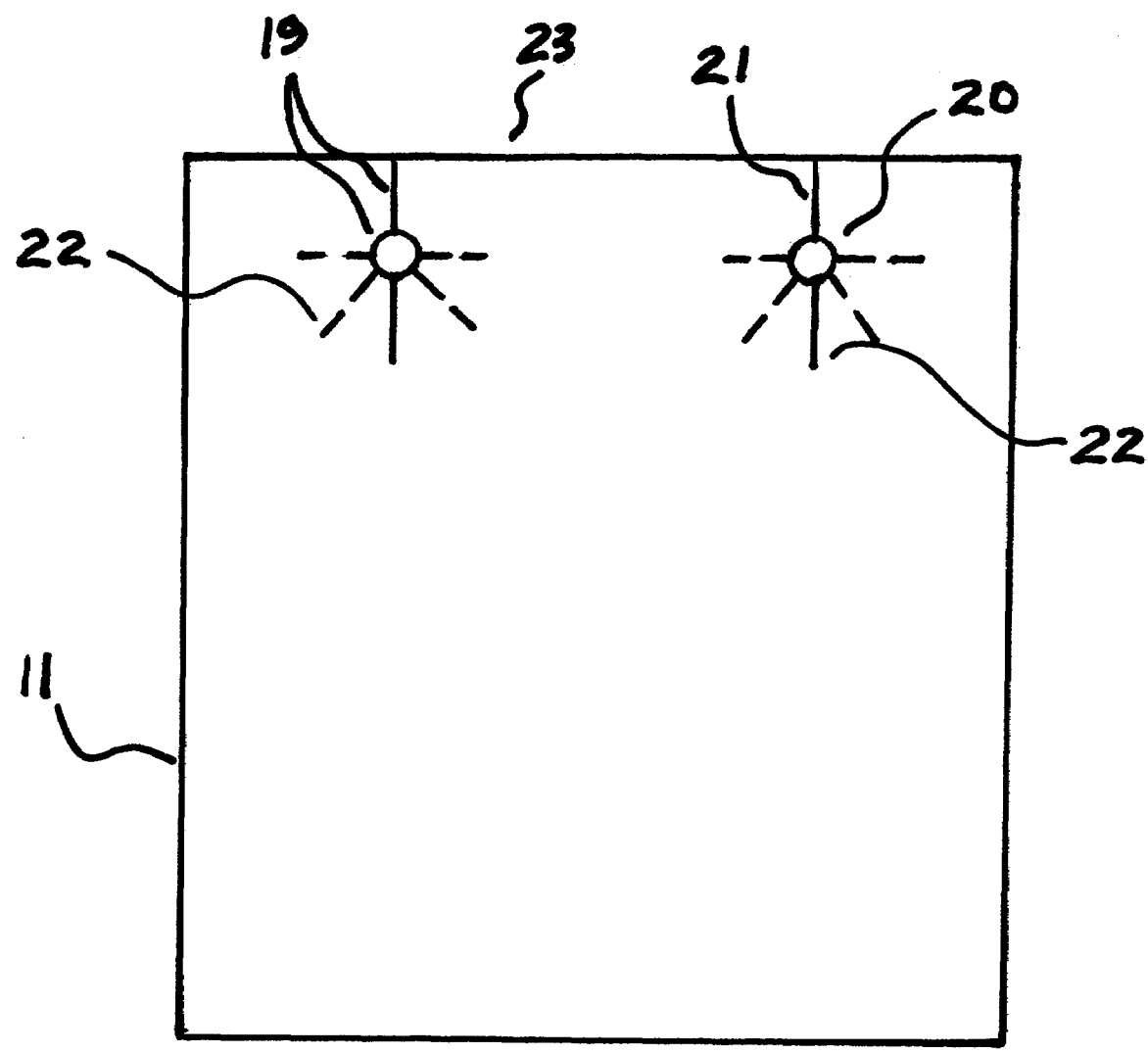
FIG. 2 shows a front view of a mud flap in accordance with the first embodiment of the present invention.

Referring to FIG. 1, there is shown a Mud Flap Mounting System 10 in accordance with the First Embodiment of the present invention. Mud Flap Mounting System 10 generally includes a mud flap 11, a bolt 12, a tightening member 13, a spring member 14 and a pressure plate 17. Mud Flap Mounting System 10 may also include spacer 15 and washer 16. Referring to FIG. 2, mud flap 11 is of the types well known in the industry and is generally a rectilinear sheet of material commonly identified as either soft rubber or flexible plastic. Top edge 23, of mud flap 11 defines at least two mounting holes 19. Both mounting holes 19 include a bolt hole 20, and a first slit 21 and at least a second slit 22. The first slit 21 extending from the top edge 23 and to its corresponding bolt hole 20. The second slit 22 or slits 22 extend from the bolt hole 20, parallel to or away from the top edge 23 of mud flap 11. Threaded distal end 24 of bolt 12 extends through Spacer 15 Pressure Plate 17 and extendable through the bolt hole 20 in mud flap 11, bracket hole 25 in mounting bracket 18, and Washer 16. Tightening member 13 is threadably received on the distal end 24 of the bolt 12 to compress spring member 14 interposed between washer 16 and tightening member 13.

Operation—First Embodiment

Figure 3:
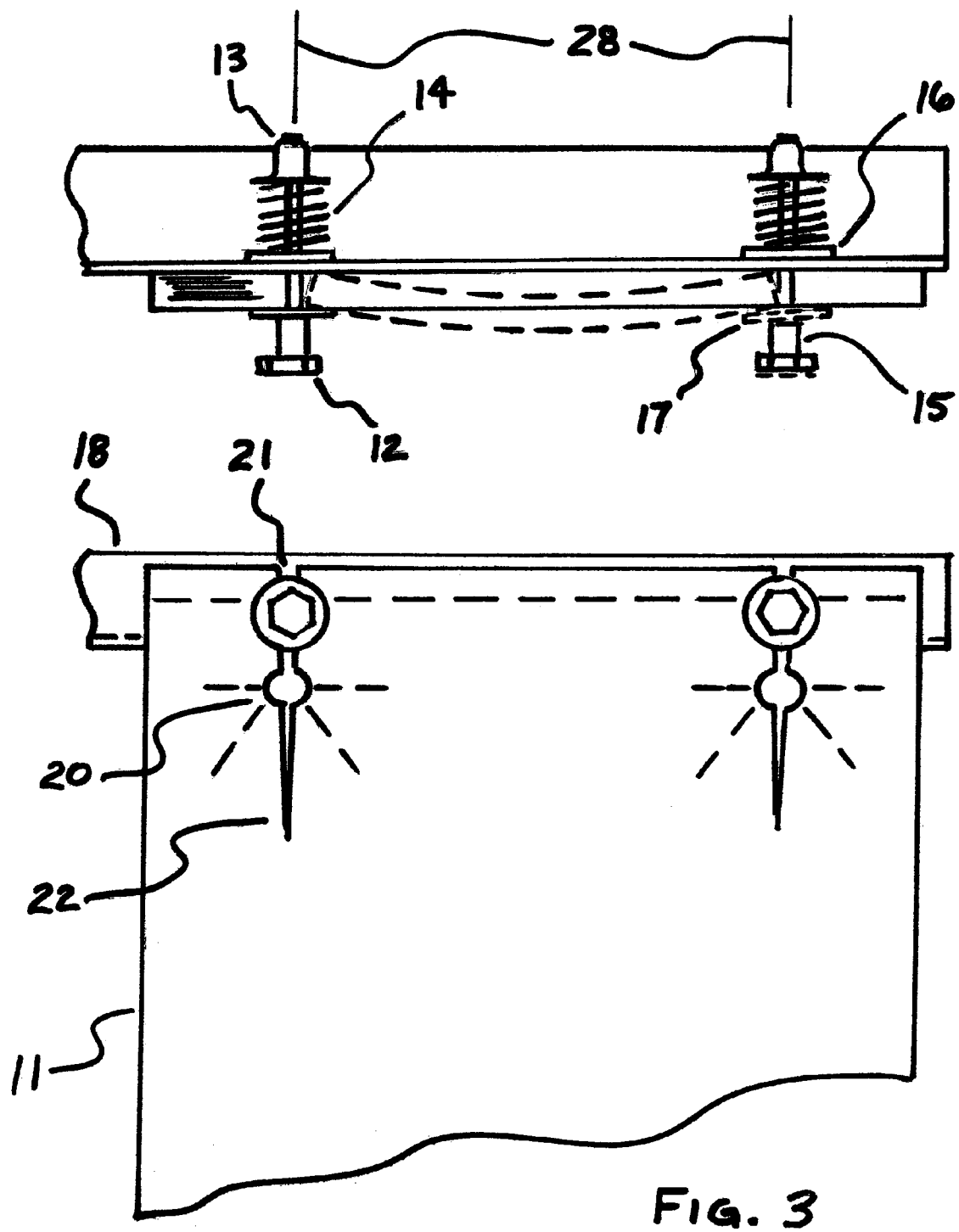
FIG. 3 shows front and top views of the mud flap installation illustrating the dynamics of the releaseability function, in accordance with the first embodiment of the present invention.

Referring to FIGS. 1 and 3, the dynamics of the releaseability function for the first Embodiment of the Mud Flap Mounting Systems 10 is as follows: The pressure of spring members 14 indirectly holds the mud flap 11 in a substantially flat vertical plane against mounting bracket 18 and prevents the tightening members 13 from unloosening during service. When the mud flap 11 is pinched between a rotating tire 29 and a curb or other obstruction while backing up the vehicle, the resultant extremely high instantaneous jerk on mud flap 11 causes the shank 27 of the mounting bolts 12 to act as a cam to spread the mud flap 11 slits 21 and 22 apart, distorting the mud flap 11 within the spaces 28 between the bolt holes 20, creating a retreating axial movement of Pressure Plates 17 and bolts 12 to release the mud flap 11 from its mounting bracket 18. To remount mud flap 11, the tightening members 13 are unscrewed by hand, without the aid of tools. Spring members 14 and washers 16 are removed. Bolts 12 with spacer 15 and Pressure Plate 17 are retracted from the mud flap mounting bracket 18. The Mud flap 11 is repositioned against mounting bracket 18 and bolts 12 with spacer 15 and Pressure Plate 17 are inserted through mud flap 11 mounting holes 20, mounting bracket holes 25, washer 16, and spring members 14. Tightening members 13 are replaced and adjusted by hand to their originally setting.

Second Embodiment

Figure 4:
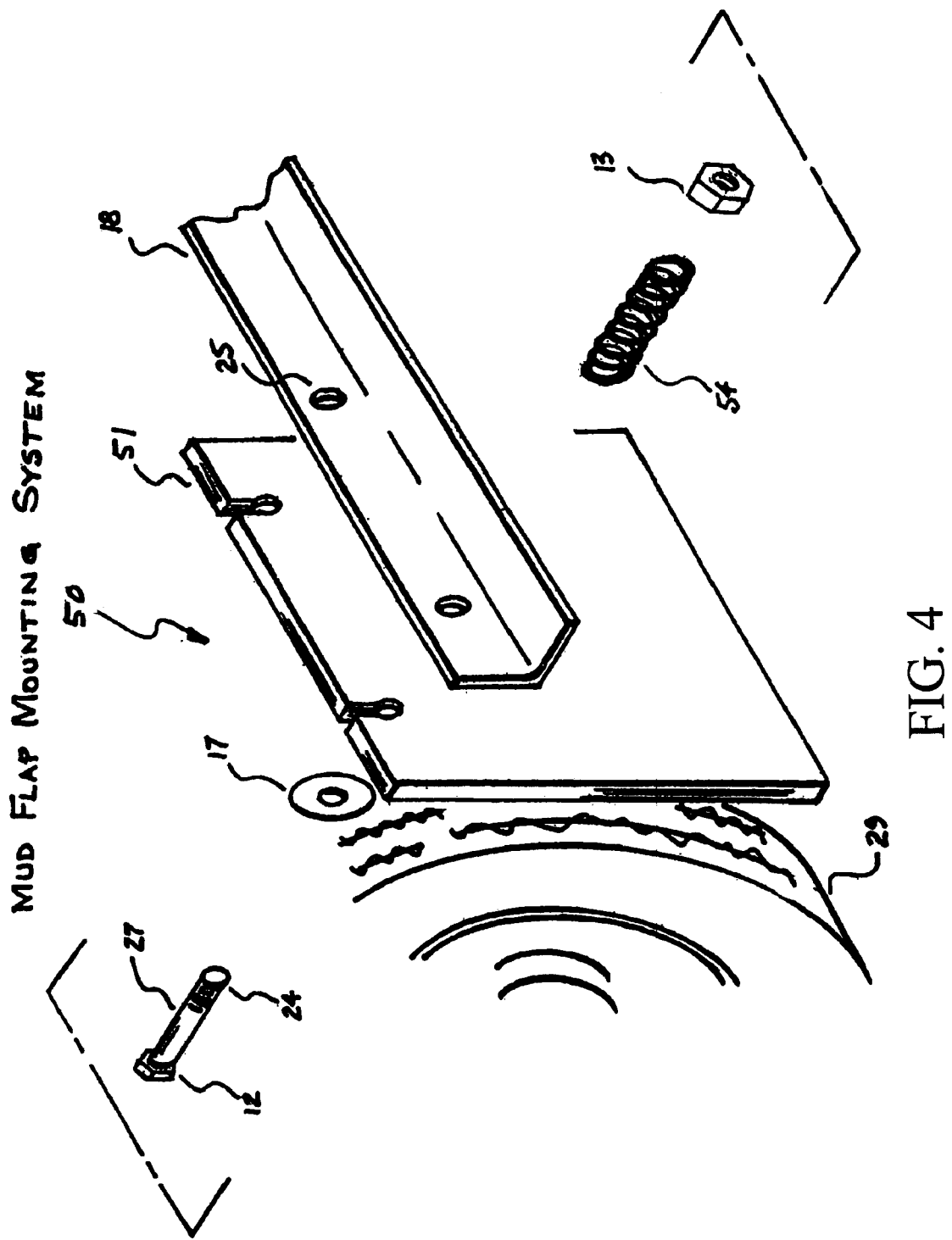
FIG. 4 is an isometric exploded view of the Mud Flap Mounting System 50, in accordance with the second embodiment of the present invention.
Figure 5:
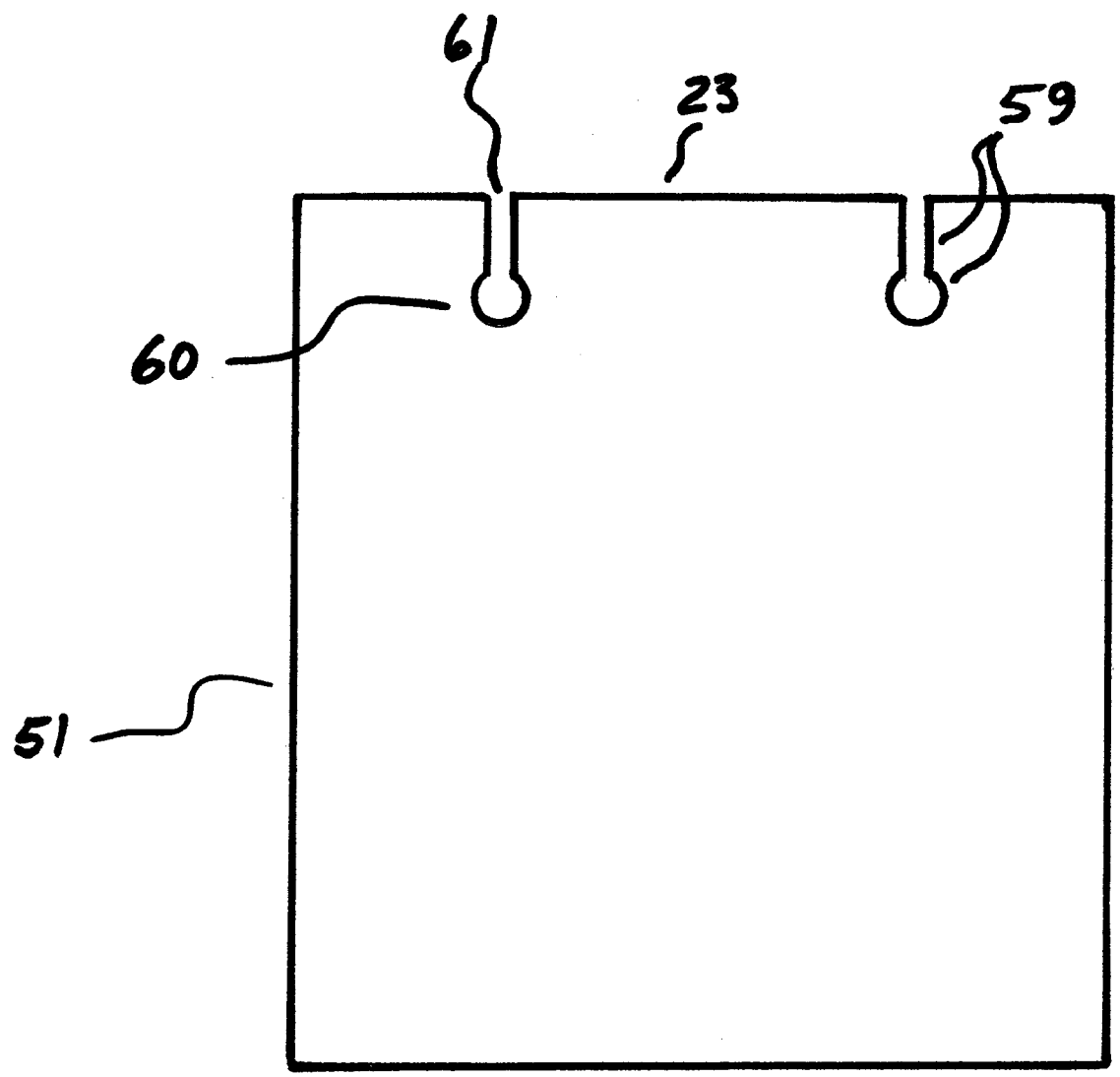
FIG. 5 shows a front view of a mud flap in accordance with the second embodiment of the present invention.

Referring to FIG. 4, there is shown a Mud Flap Mounting System 50 in accordance with the Second Embodiment of the present invention. Mud Flap Mounting System 50 employs the same components as in the first embodiment with the exception of the mud flap and spring member. Referring to FIGS. 4 and 5, top edge 23, of mud flap 51 defines at least two mounting holes 59. Both mounting holes 59 include a bolt hole 60 and a slot 61 extending from top edge 23 and to its corresponding bolt hole 60. Slot 61 width approximates the diameter dimension of the mounting bolt. A stronger spring member 54 is required for this embodiment to provide the necessary clamping force to secure the mud flap in the service position. Threaded distal end 24 of bolt 12 extends through spacer 15, Pressure Plate 17 and extendable through bolt hole 60 in mud flap 51 and bracket hole 25 in mounting bracket 18 and washer 16. Tightening member 13 is threadably received on the distal end 24 of bolt 12 to compress spring member 54 interposed between washer 16 and tightening member 13.

Operation—Second Embodiment

Figure 6:
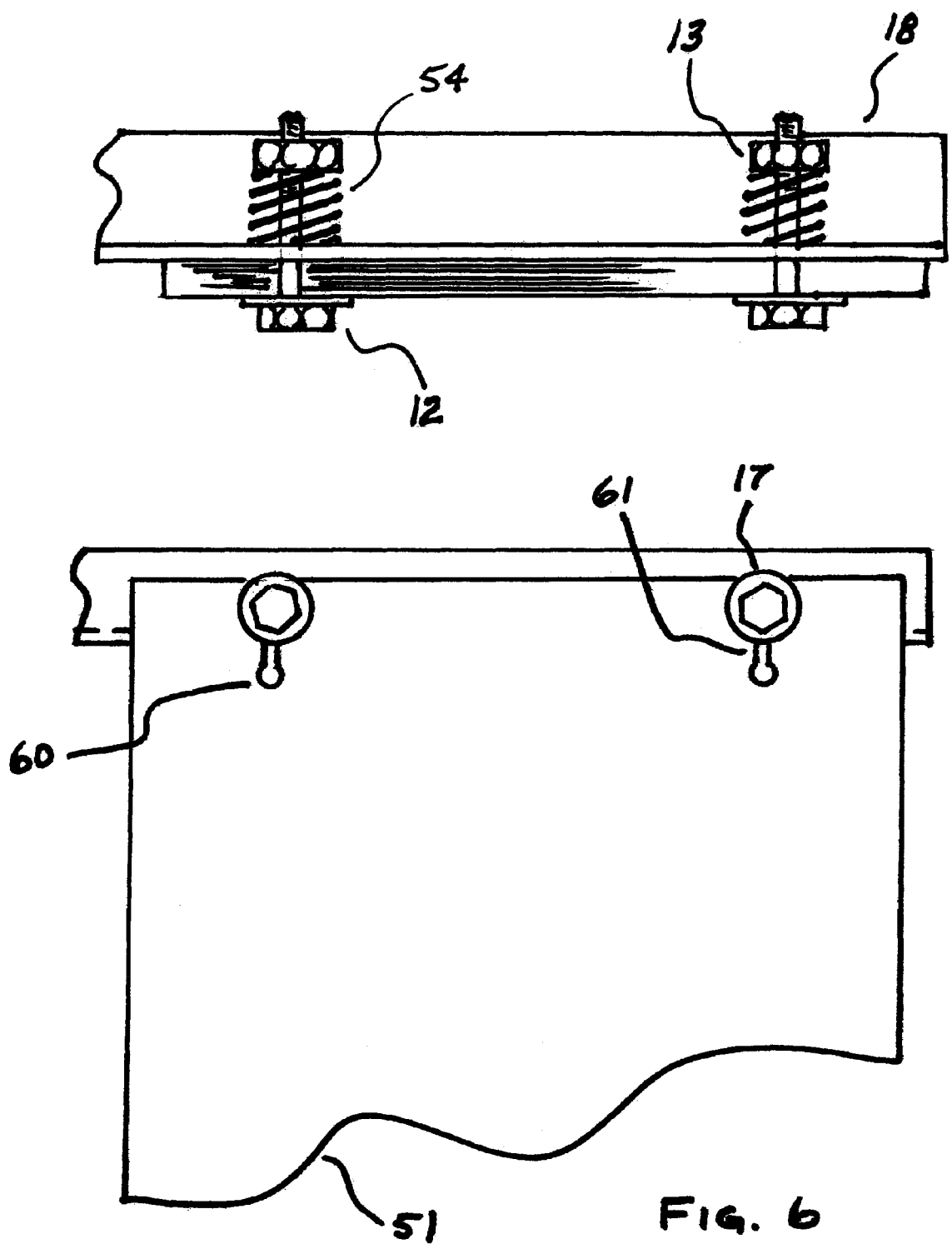
FIG. 6 shows front and top views of the mud flap installation illustrating the releasability function, in accordance with second embodiment of the present invention.
Figure 7B:
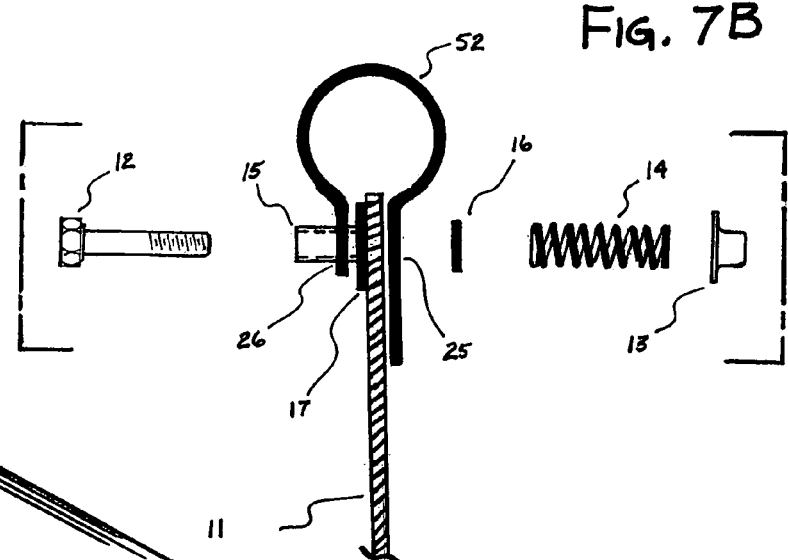
FIGS. 7A, 7B, 8A and 8B shows exploded and end views of the Mud Flap Mounting System 10 when used with typical contemporary mud flap mounting bracket designs, in accordance with the first embodiment of the present invention.
Figure 7A:
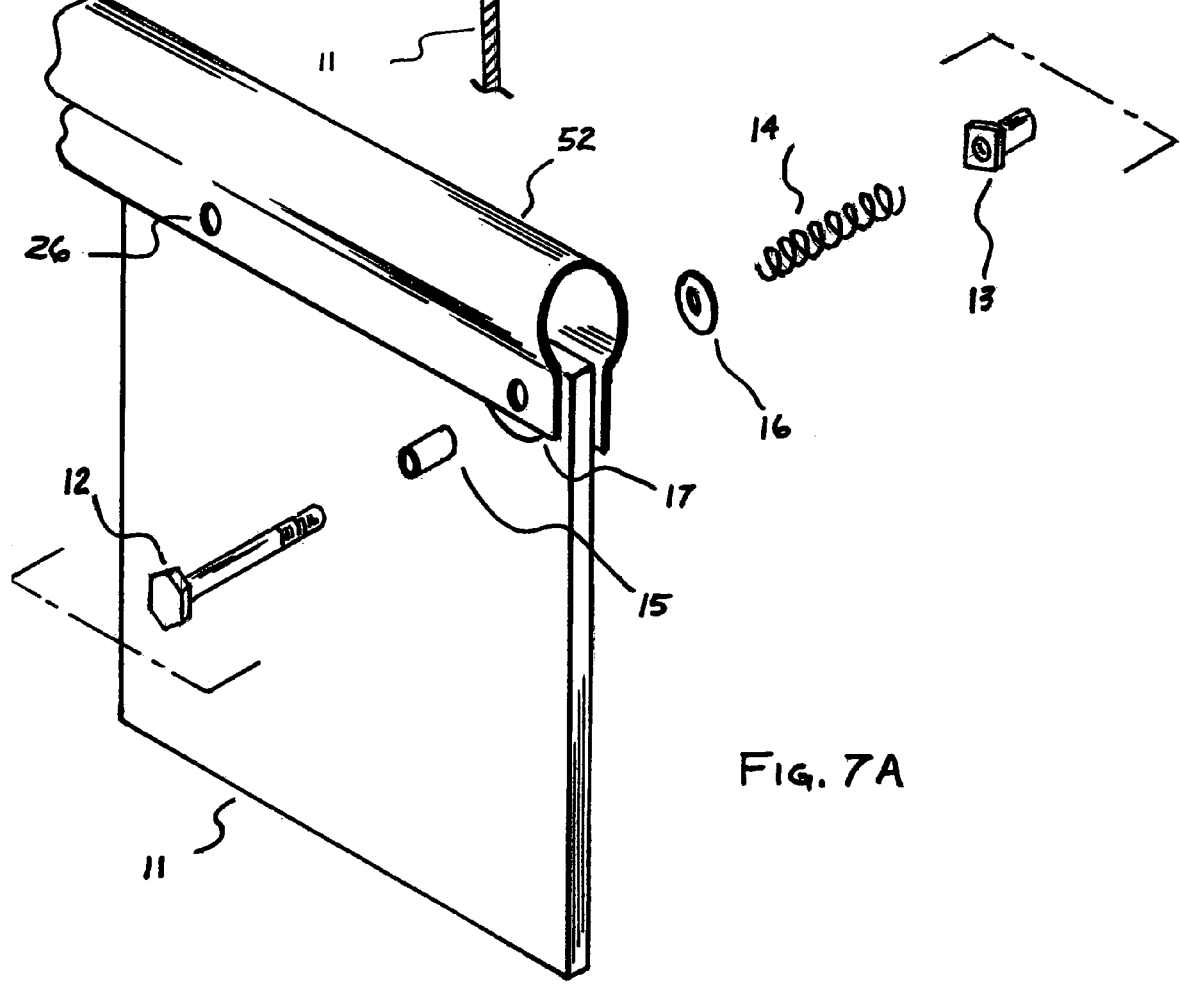
Figure 8B:
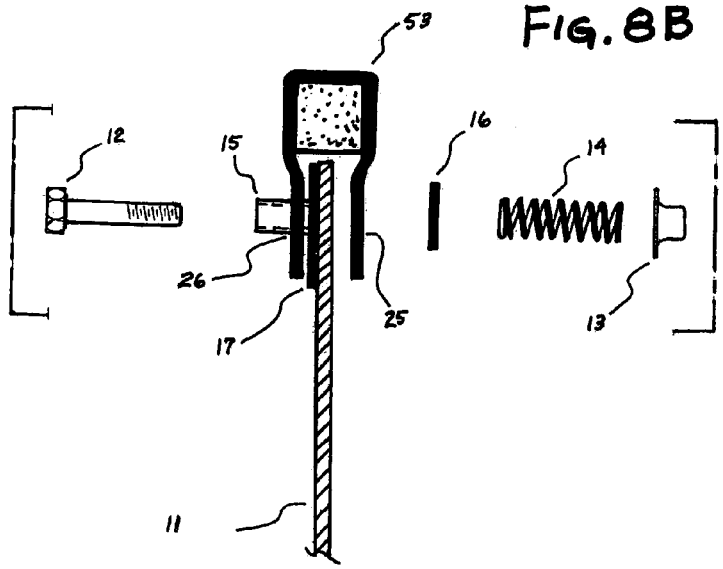
Figure 8A:
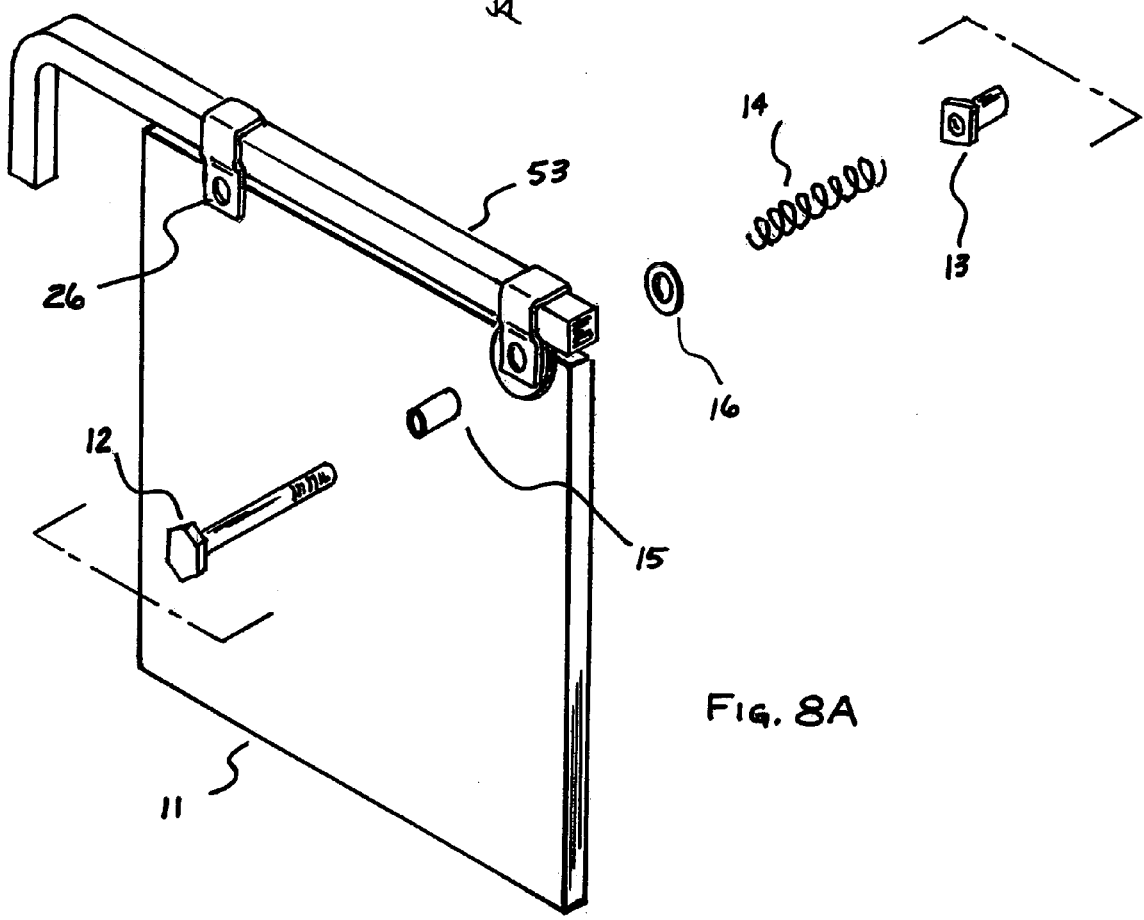
Figures 9A, 9B:
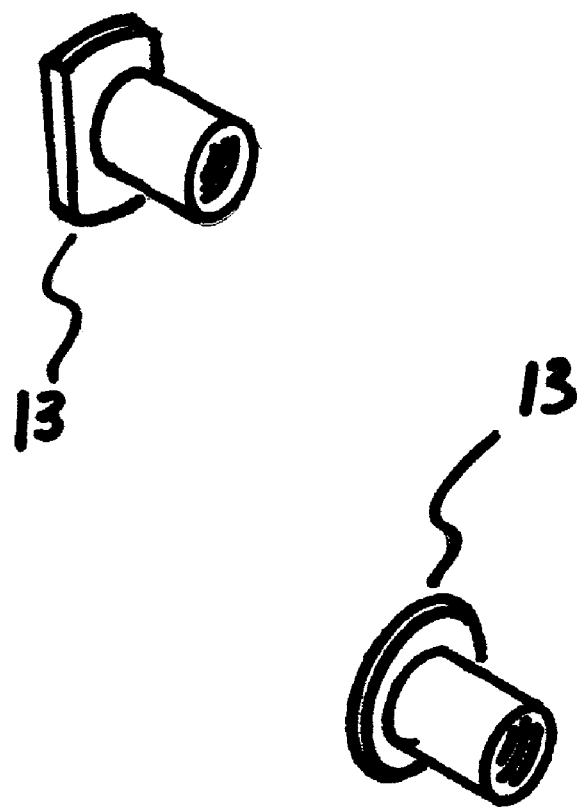
FIGS. 9A and 9B shows alternate weld nut tightening member designs in accordance with the first embodiment of the present invention.
Figure 10A:
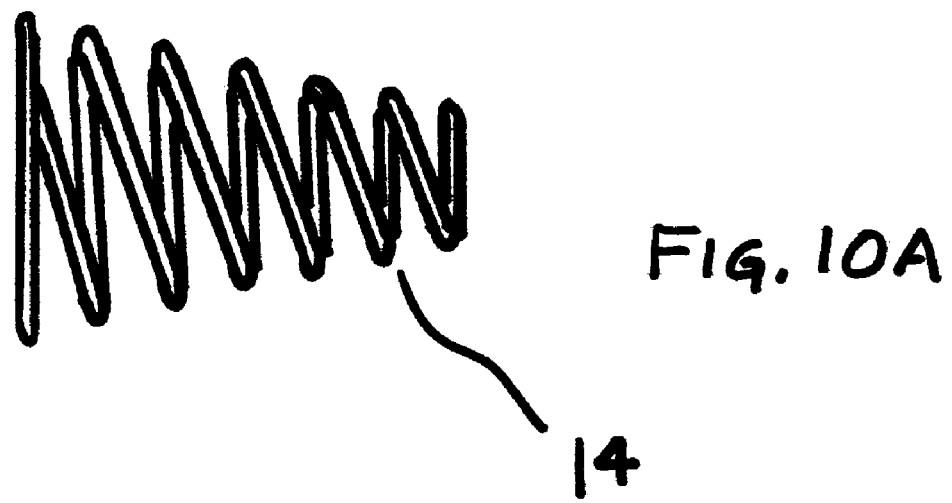
FIGS. 10A, 10B, 10C and 10D shows alternate spring member designs in accordance with the first embodiment of the present invention.
Figure 10B:
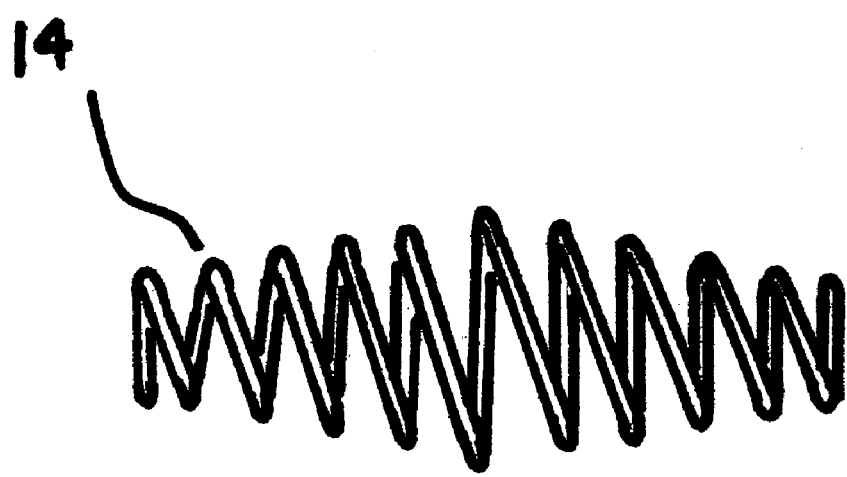
Figure 10C:
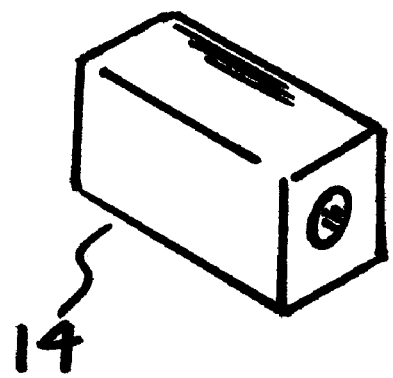
Figure 10D:
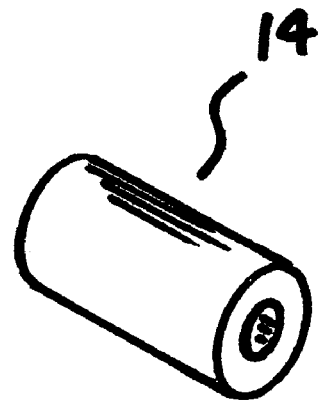
Figure 10E:
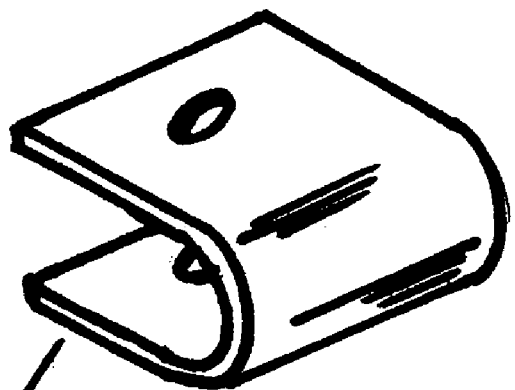
FIGS. 10E and 10F shows alternate leaf type spring member designs in accordance with the first and second embodiments of the present invention.
Figure 10F:
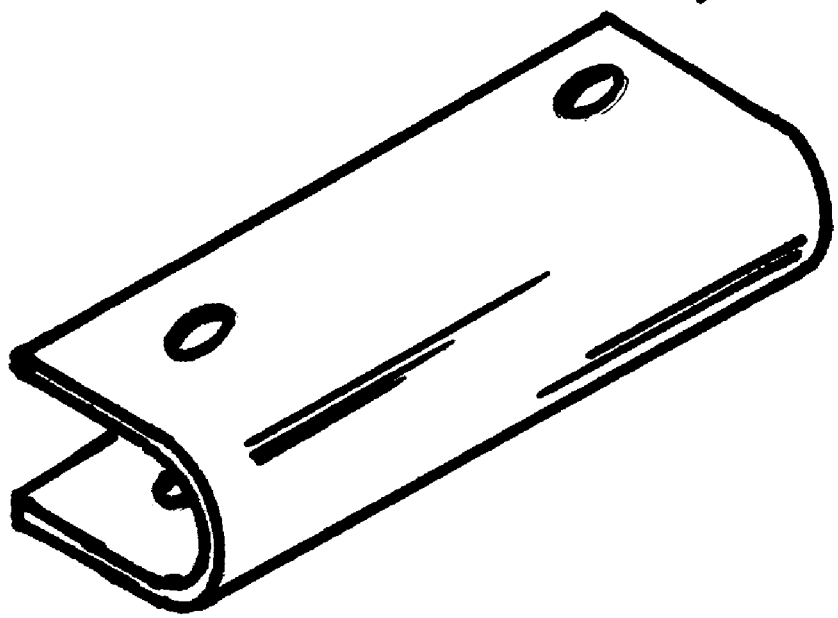
Figure 11D:
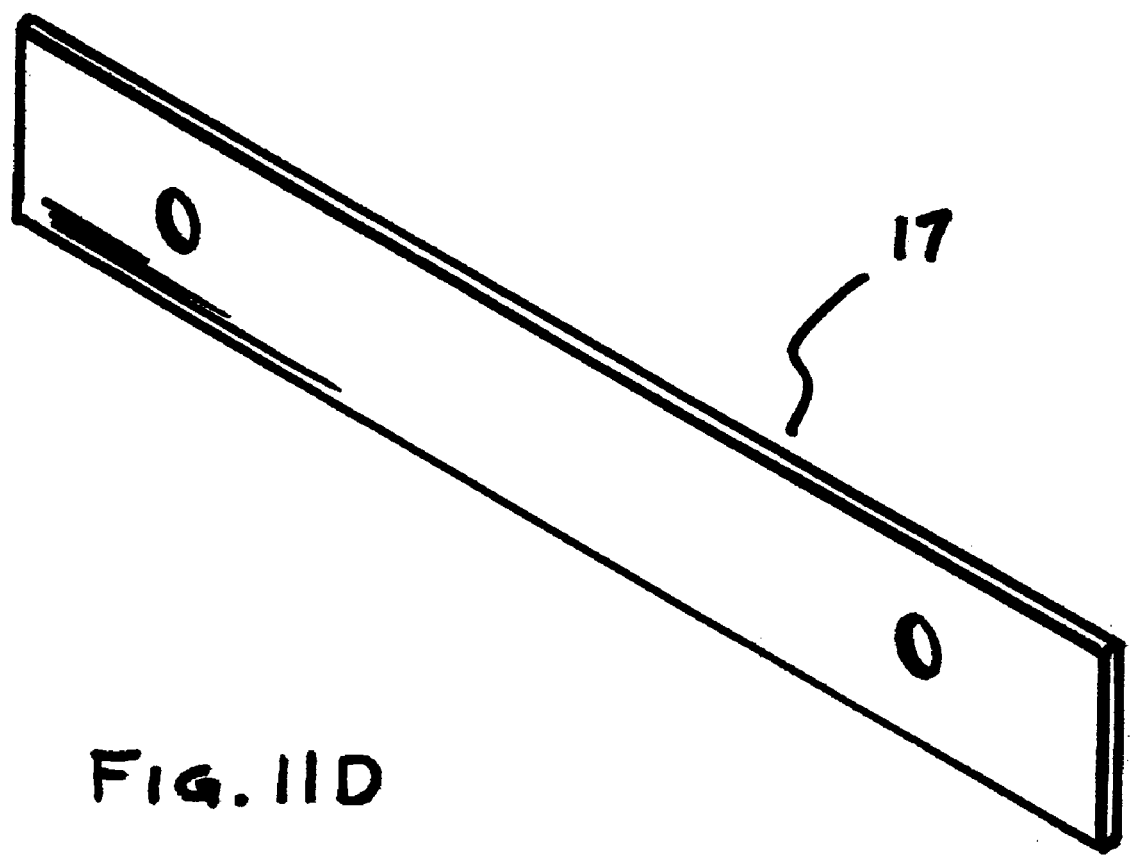
Figure 11E:
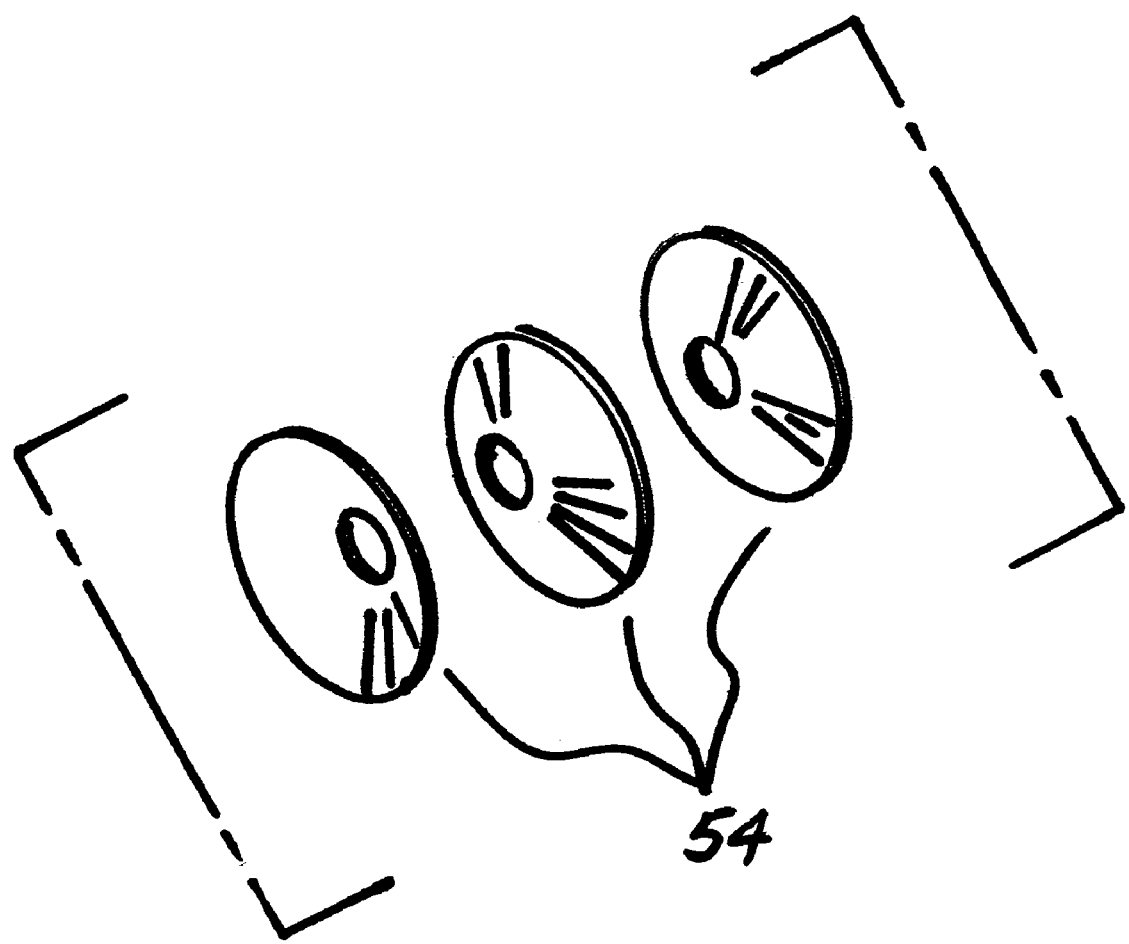
FIG. 11E shows alternate Belleville type spring member in accordance with the second embodiment of the present invention.
Figure 12:
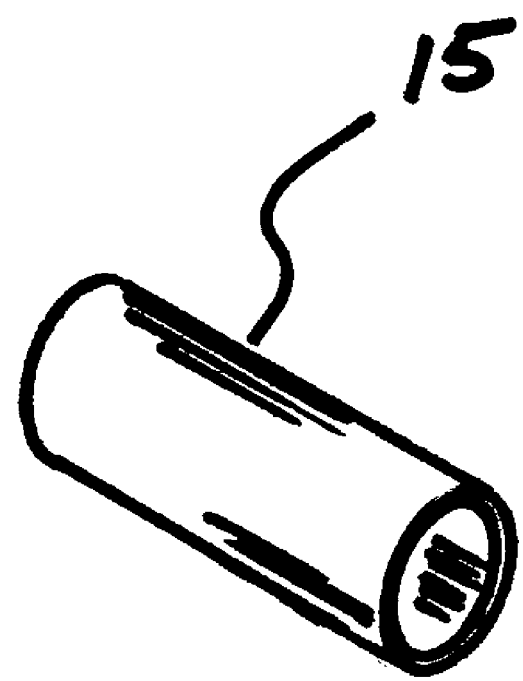
FIG. 12 shows spacer member in accordance with the first embodiment of the present invention.

Referring to FIGS. 4 and 6, the dynamics of the releaseability function for the Second Embodiment of Mud Flap Mounting System 50 is as follows: The force of spring members 54 hold the mud flap 51 in a substantially flat vertical plane against the mounting bracket 18 during service. When mud flap 51 is pinched between a rotating tire 29 and a curb or other obstruction while backing up the vehicle, the extremely high instantaneous jerk on the mud flap 51 causes the mud flap 51 to be pulled past the bolts 12 which releases the mud flap 51 from its mounting bracket. To remount mud flap 51, the tightening members 13 are loosened with tools to release spring member 54 pressure, allowing replacement of mud flap 51 on the mounting bracket 18. The tightening members 13 are then adjusted with tools' to compress the spring members 14 to their originally setting.

Other Applications

Referring to FIGS. 7A, 7B, 8A and 8B, there is shown two other typical applications of Mud Flap Mounting System 10 in accordance with the first embodiment of the present invention as applied to contemporary designs of mud flap mounting brackets 52 and 53. Note that spacer 15 extends through bracket hole 26 to contact Pressure Plate 17 in the applications shown.

All alternate components shown in the drawing figures are identified with component reference numbers as indicated herein. The drawing figures are intentionally not shown in any particular scale.

While this disclosure reveals and describes certain specific embodiments of the invention, it will be apparent to those skilled in the art that various modifications and rearrangements of the components of the Mud Flap Mounting Systems may be made so as to be adaptable to other existing mud flap mounting bracket designs without departing from the spirit and scope of the invention concept and that the same should not be limited to the particular forms herein revealed and described, except insofar as indicated by the scope of the appended claims.

What I claim as my invention is:

1. A mud flap mounting system for connection to a mud flap mounting bracket of a vehicle, the mounting bracket having a plurality of bracket holes, comprising of;

(a) a sheet of flexible material having a top edge and defining at least two mounting openings, each mounting opening includes a bolt hole, a first slit and at least a second slit, said slit being a severed portion of said sheet of flexible material with virtually no loss of said material; the first slit extending from the top edge to a corresponding bolt hole; the second slit or slits extend from the bolt hole, parallel to and/or away from top edge of sheet;

(b) a bolt with a bolt head and having a threaded distal end extending through one of the bolt holes in the sheet of flexible material and extendable through a bracket hole in the mounting bracket of a vehicle.

(c) a flat pressure plate member interposed between said sheet and said bolt head.

(d) a tightening member threadably received on the distal end of said bolt (e) a spring member interposed between said mounting bracket of said vehicle and said tightening member.

2. The mud flap mounting system in claim 1, further including a washer interposed between said mounting bracket of said vehicle and said spring member.

3. The mud flap mounting system in claim 1, further including a spacer interposed between said bolt head and said pressure plate.

4. The mud flap mounting system in claim 3, wherein said bolt and said spacer may be combined to form a shoulder bolt.

5. the mud flap mounting system of claim 4, wherein said shoulder bolt may be a headless shoulder bolt.

6. The mud flap mounting system in claim 1, wherein said pressure plate has a convex shape, with convex surface installed away from the mud flap.

7. The mud flap mounting system in claim 1, wherein said pressure plate has an interrupted surface (i.e. serrations, dimples, etc.), which is installed against the mud flap.

8. The mud flap mounting system in claim 1, wherein said pressure plate is combined with other pressure plates into a single elongated strip of material with holes spaced to match that of the mud flap and mounting bracket hole spacing.

9. The mud flap mounting system in claim 1, wherein said tightening members may be installed or removed without the aid of tools.

10. The mud flap mounting system in claim 1, wherein said tightening member is an internally threaded nut.

11. The mud flap mounting system of claim 10, wherein said nut is a common generic term, not meant to exclude any particular design of internally threaded fastener.

12. The mud flap mounting system of claim 11, wherein said nut is a weld nut.

13. The mud flap mounting system of claim 12, wherein said weld nut may have a slab base.

14. The mud flap mounting system of claim 13, wherein said weld nut may have a round base.

15. The mud flap mounting system of claim 12, wherein said weld nut may be installed bi-directional.

16. The mud flap mounting system in claim 1, wherein said tightening member may have an integral thread locking feature.

17. The mud flap mounting system of claim 1, wherein said spring member is a coil spring.

18. The mud flap mounting system of claim 17, wherein said spring member is a cone shaped coil spring.

19. The mud flap mounting system of claim 17, wherein said spring member may be a double cone ended coil spring.

20. The mud flap mounting system in claim 1, wherein said spring member may be an elastomer type material such as polyurethane.

21. The mud flap mounting system in claim 1, wherein said spring member may be a leaf spring with individual or multiple holes for said bolts.

22. The mud flap mounting system in claim 1, wherein said spring member provides an anti-rotational (locking) feature for the tightening member.

23. The mud flap mounting system in claim 1, wherein components are made of corrosion resistant materials.

24. A mud flap system for attachment to the rear of vehicle, comprising of;

(a) mud flap mounting system of claim 1;

(b) a mud flap mounting bracket mountable on said vehicle behind the rear tires and having a plurality of bracket holes for attachment of the mud flap mounting.

* * * * *